United States Patent
Murakami et al.

(10) Patent No.: US 8,747,542 B2
(45) Date of Patent: Jun. 10, 2014

(54) METHOD FOR PRODUCING RUTILE TITANIUM OXIDE SOL

(75) Inventors: Natsumi Murakami, Sodegaura (JP); Ai Miyamoto, Sodegaura (JP); Yoshinari Koyama, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 13/985,370

(22) PCT Filed: Feb. 15, 2012

(86) PCT No.: PCT/JP2012/053554
§ 371 (c)(1),
(2), (4) Date: Aug. 14, 2013

(87) PCT Pub. No.: WO2012/111717
PCT Pub. Date: Aug. 23, 2012

(65) Prior Publication Data
US 2013/0331463 A1    Dec. 12, 2013

(30) Foreign Application Priority Data
Feb. 15, 2011   (JP) .................. 2011-029852

(51) Int. Cl.
*C01G 23/053* (2006.01)
*C09C 1/36* (2006.01)
*C09D 5/00* (2006.01)
*B01F 3/12* (2006.01)
*B01J 13/00* (2006.01)

(52) U.S. Cl.
CPC ............ *C01G 23/053* (2013.01); *C09D 5/00* (2013.01); *C09C 1/3669* (2013.01); *B01F 3/12* (2013.01); *B01F 3/1207* (2013.01); *B01F 3/1214* (2013.01); *B01J 13/0047* (2013.01); *C01P 2002/00* (2013.01); *C01P 2002/70* (2013.01); *C01P 2002/72* (2013.01); *C01P 2004/10* (2013.01); *C01P 2004/32* (2013.01); *C01P 2004/64* (2013.01); *Y10S 516/928* (2013.01)
USPC ...... 106/287.19; 106/436; 106/447; 423/610; 516/90; 516/928

(58) Field of Classification Search
CPC ...... C01G 23/053; C09C 1/3669; C09D 5/00; B01F 3/12; B01F 3/1207; B01F 3/1214; B01J 13/0047; C01P 2002/00; C01P 2002/70; C01P 2002/72; C01P 2004/10; C01P 2004/32; C01P 2004/64

USPC ........ 106/287.19, 436, 447; 423/610; 516/90, 516/928
See application file for complete search history.

(56) References Cited

U.S. PATENT DOCUMENTS

| | | | |
|---|---|---|---|
| 6,884,753 B2 * | 4/2005 | Sakatani et al. | 502/350 |
| 7,045,005 B2 * | 5/2006 | Sakatani et al. | 106/287.17 |
| 7,645,436 B1 * | 1/2010 | Ryang | 423/511 |
| 8,168,145 B2 * | 5/2012 | Wada et al. | 423/81 |
| 2005/0233146 A1 | 10/2005 | Nonninger | |
| 2008/0293831 A1 * | 11/2008 | Kato et al. | 516/90 |
| 2010/0266486 A1 | 10/2010 | Put et al. | |
| 2011/0274767 A1 * | 11/2011 | Kato et al. | 424/617 |

FOREIGN PATENT DOCUMENTS

| | | |
|---|---|---|
| EP | 2 366 667 A1 | 9/2011 |
| JP | A-2-255532 | 10/1990 |
| JP | A-10-245224 | 9/1998 |
| JP | A-2005-132706 | 5/2005 |
| JP | A-2005-528309 | 9/2005 |
| JP | A-2009-227519 | 10/2009 |
| JP | A-2011-502937 | 1/2011 |
| WO | WO 2010/055770 A1 | 5/2010 |

OTHER PUBLICATIONS

International Search Report issued in International Application No. PCT/JP2012/053554 on May 22, 2012 (with translation).
Written Opinion of the International Searching Authority issued in International Application No. PCT/JP2012/053554 on May 22, 2012 (with translation).

* cited by examiner

Primary Examiner — Anthony J Green
(74) Attorney, Agent, or Firm — Oliff PLC

(57) ABSTRACT

A method for producing a rutile titanium oxide sol having a particle diameter measured by dynamic light scattering of 5 nm to 100 nm, the method comprising: a process (a): mixing a tin oxalate aqueous solution, a titanium alkoxide, oxalic acid, a quaternary ammonium hydroxide, and water, while adjusting, per mole of titanium atoms, a proportion of tin atoms to be from 0.1 mol to 0.8 mol, a proportion of the oxalic acid to be from 0.01 mol to 5 mol, and a proportion of the quaternary ammonium hydroxide to be from 0.1 mol to 3.5 mol to prepare a titanium-containing aqueous solution having a concentration in terms of $TiO_2$ of 0.1% by mass to 15% by mass; and a process (b): performing hydrothermal treatment on the titanium-containing aqueous solution produced in the process (a) at 100° C. to 200° C.

4 Claims, No Drawings

METHOD FOR PRODUCING RUTILE TITANIUM OXIDE SOL

TECHNICAL FIELD

The present invention relates to a method for producing a rutile titanium oxide sol.

BACKGROUND ART

The crystal structures of titanium oxides have three types of a tetragonal rutile type of a high temperature form, a tetragonal anatase type of a low temperature form, and a rhombic brookite type. Among them, rutile titanium oxides have high refractive indexes and thus are used as refractive index adjusters.

For application in optical materials, not only a high refractive index but also sufficient transparency as a coating film is required. However, rutile titanium oxides are generally produced by a solid phase method in which amorphous titanium oxides or anatase titanium oxides are calcined at a high temperature, and therefore, the particle diameters increase, thereby the transparency is impaired.

A wet method enables low temperature synthesis, which readily produces fine particles as compared with the solid phase method requiring high temperature calcination. Examples of a method for producing a ruffle titanium oxide sol by a wet method include a method of causing a reaction under the coexistence of a titanium salt and a tin compound having a rutile structure.

As the method using a titanium salt and a tin compound, disclosed is a method for producing an aggregate of titanium oxide-tin oxide composite colloids at 50° C. to 100° C. by causing a strong acid salt of titanium to react with metal tin in the presence of hydrogen peroxide (see Patent Document 1). Also disclosed is a method for producing rutile titanium oxide fine particles by causing a titanium compound solution to react at a temperature from room temperature to 100° C. in a pH range of −1 to 3 under the coexistence of a tin compound having a Sn/Ti molar ratio of 0.001 to 2 (see Patent Document 2). As a method for causing a gel containing titanium atoms dissolved in hydrogen peroxide to react, disclosed are a method in which a hydrated titanium oxide gel dissolved in hydrogen peroxide is mixed with cation-exchanged potassium stannate, and the resultant mixture is heat-treated (see Patent Document 3), a method in which a titanium compound is reacted with a tin compound and ammonia to produce a gel, and the gel is dissolved in hydrogen peroxide and is subjected to hydrothermal treatment (see Patent Document 4), and other methods.

PRIOR ART DOCUMENTS

Patent Documents

Patent Document 1: Japanese Patent Application Publication No. H10-245224 (JP H10-245224 A)
Patent Document 2: Japanese Patent Application Publication No. 2005-132706 (JP 2005-132706 A)
Patent Document 3: Japanese Patent Application Publication No. H2-255532 (JP H2-255532 A)
Patent Document 4: Japanese Patent Application Publication No. 2009-227519 (JP 2009-227519 A)

SUMMARY OF THE INVENTION

Problem to be Solved by the Invention

The method disclosed in Patent Document 1 produces aggregate slurry of a titanium oxide-tin oxide composite colloidal particles having a primary particle diameter of 2 nm to 20 nm, and therefore, the electrolyte contained needs to be removed in order that a well dispersed sol is obtained. The method disclosed in Patent Document 2 produces a precipitate and thus requires a solid-liquid separator. The method disclosed in Patent Document 3 has difficulty in stably preparing a gel or a sol of a hydrated titanium oxide with a high specific surface area, and therefore, the crystallinity of the resultant titanium oxide disadvantageously fluctuates. Furthermore, in the method, impurities such as alkalis remain in the gel or the sol of the hydrated titanium oxide, and therefore, the resultant rutile titanium oxide always disadvantageously contains alkalis. The method disclosed in Patent Document 4 essentially involves washing of a mixed gel of a titanium hydroxide and a tin hydroxide but removal of impurity ions is difficult. The method requires many hours for washing, and also requires a solid-liquid separator. Therefore, the method is not industrially preferred.

The present invention provides a method for efficiently producing a rutile titanium oxide sol that substantially contains no impurity, for example, alkali metals such as sodium and potassium, and chlorine, does not require a solid-liquid separating process, has excellent dispersibility, and has a particle diameter measured by dynamic light scattering of 5 nm to 100 nm.

Means for Solving the Problem

The inventors of the present invention have intensively studied in order to solve the foregoing problems and as a result have found that a well dispersed rutile titanium oxide sol can be produced without causing precipitation or producing an aggregate by performing hydrothermal treatment on a titanium-containing aqueous solution containing a tin salt in the presence of oxalic acid and a quaternary ammonium hydroxide. Specifically, the present invention provides:

as a first aspect, a method for producing a rutile titanium oxide sol having a particle diameter measured by dynamic light scattering of 5 nm to 100 nm, the method comprising:

a process (a): mixing a tin oxalate aqueous solution, a titanium alkoxide, oxalic acid, a quaternary ammonium hydroxide, and water, while adjusting, per mole of titanium atoms, the proportion of tin atoms to be from 0.1 mol to 0.8 mol, the proportion of the oxalic acid to be from 0.01 mol to 5 mol, and the proportion of the quaternary ammonium hydroxide to be from 0.1 mol to 3.5 mol to prepare a titanium-containing aqueous solution having a concentration in terms of $TiO_2$ of 0.1% by mass to 15% by mass, and a process (b): performing hydrothermal treatment on the titanium-containing aqueous solution produced in the process (a) at 100° C. to 200° C.;

as a second aspect, the method for producing a rutile titanium oxide sol according to the first aspect, in which the titanium alkoxide is a tetraalkoxytitanium of general formula (I):

$$Ti(OR^1)_4 \qquad (I)$$

[in formula (I), $R^1$ are the same as or different from each other and are $C_{1-3}$ alkyl groups];

as a third aspect, the method for producing a rutile titanium oxide sol according to the first aspect, in which the quaternary ammonium hydroxide is represented by general formula (II):

$$[NR^2R^3R^4R^5]OH \qquad (II)$$

[in formula (II), $R^2$, $R^3$, $R^4$, and $R^5$ are each independently a $C_{1-8}$ alkyl group, a $C_{1-8}$ hydroxyalkyl group, a $C_{7-15}$ aryloxyalkyl group, or a benzyl group]; and as a fourth aspect, the method for producing a rutile titanium oxide sol according to the third aspect, in which the quaternary ammonium hydroxide is tetramethylammonium hydroxide or tetraethylammonium hydroxide.

Effects of the Invention

A rutile titanium oxide sol produced by the method for producing a rutile titanium oxide sol according to the present invention substantially contains no impurity, for example, alkali metals such as sodium and potassium, and chlorine and has high transparency. The dried film of the rutile titanium oxide sol has a high refractive index of about 1.9 or higher and also has excellent water resistance, moisture resistance, light resistance, weatherability, heat resistance, wear resistance, and other properties.

Furthermore, the ruffle titanium oxide sol produced by the method for producing a rutile titanium oxide sol according to the present invention can be mixed with various types of binders to be used as a coating composition. Application of this composition to a base material can form a coating film that has high transparency without impairing the transparency of the base material and has a high refractive index.

MODES FOR CARRYING OUT THE INVENTION

In the present invention, first, in the process (a), a tin oxalate aqueous solution, a titanium alkoxide, oxalic acid, a quaternary ammonium hydroxide, and water are mixed to prepare a titanium-containing aqueous solution. The order of mixing the tin oxalate aqueous solution, the titanium alkoxide, the oxalic acid, the quaternary ammonium hydroxide, and the water is not limited to this.

The tin oxalate aqueous solution, the titanium alkoxide, the oxalic acid, and the quaternary ammonium hydroxide to be mixed are adjusted such that, per mole of titanium atoms, the proportion of tin atoms is from 0.1 mol to 0.8 mol, the proportion of the oxalic acid is from 0.01 mol to 5 mol, and the proportion of the quaternary ammonium hydroxide is from 0.1 mol to 3.5 mol.

The proportion of the tin atoms is adjusted to be from 0.1 mol to 0.8 mol per mole of titanium atoms. When the proportion of the tin atoms is less than 0.1 per mole of titanium atoms, the crystallinity of the resultant rutile titanium oxide may be insufficient and an anatase titanium oxide may be produced. In contrast, when the proportion of the tin atoms exceeds 0.8 per mole of titanium atoms, the content of a tin oxide in the resultant rutile titanium oxide sol increases, and thus the refractive index of the titanium oxide is lowered, which is not preferred.

The proportion of the oxalic acid is adjusted to be from 0.01 mol to 5 mol per mole of titanium atoms. When the proportion of the oxalic acid is less than 0.01 mol per mole of titanium atoms, a target single-phase rutile titanium oxide sol cannot be obtained because an anatase titanium oxide is partly produced after the hydrothermal treatment in the process (b). In contrast, when the proportion of the oxalic acid exceeds 5 mol per mole of titanium atoms, the pH of the titanium-containing aqueous solution is less than 3. As a result, a suspension of rutile titanium oxide colloidal particles having a particle diameter measured by dynamic light scattering exceeding 100 nm is obtained after the hydrothermal treatment in the process (b), and a target rutile titanium oxide sol cannot be obtained.

The proportion of the quaternary ammonium hydroxide is adjusted to be from 0.1 mol to 15 mol per mole of titanium atoms. When the proportion of the quaternary ammonium hydroxide is less than 0.1 mol per mole of titanium atoms, a suspension of rutile titanium oxide colloidal particles having a particle diameter measured by dynamic light scattering exceeding 100 nm is obtained after the hydrothermal treatment in the process (b), and a target rutile titanium oxide sol cannot be obtained. In contrast, when the proportion of the quaternary ammonium hydroxide exceeds 3.5 mol per mole of titanium atoms, a brookite titanium oxide is produced in addition to a rutile titanium oxide after the hydrothermal treatment in the process (b), and a single-phase rutile titanium oxide sol cannot be obtained.

The titanium-containing aqueous solution may be prepared by adjusting the amount of water to be used as needed so that the concentration thereof in terms of $TiO_2$ is 0.5% by mass to 15% b mass. In terms of $TiO_2$ herein means that a Ti amount in a hydrolysis polycondensation product is represented in the form of its oxide, $TiO_2$, for convenience, and that $TiO_2$ whose number of moles is the same as that of a titanium alkoxide is contained in a hydrolysis condensation product.

The tin oxalate aqueous solution, the titanium alkoxide, the oxalic acid, the quaternary ammonium hydroxide, and the water are preferably mixed with stirring. The titanium-containing aqueous solution produced may be heated at 60° C. to 100° C. before the hydrothermal treatment is performed in the process (b).

The pH of the titanium-containing aqueous solution prepared in the process (a) is 3.0 to 14.0.

The tin oxalate aqueous solution used in the present invention can be produced by allowing metal tin, oxalic acid, and hydrogen peroxide to react in an aqueous medium. The tin oxalate aqueous solution is preferably produced by imtermittently or continuously adding hydrogen peroxide and metal tin little by little alternately into an oxalic acid aqueous solution so that a $H_2O_2/Sn$ molar ratio is maintained at 2 to 3. When the whole amount of hydrogen peroxide is added to an oxalic acid aqueous solution, followed by addition of metal tin thereto, the hydrogen peroxide is mostly decomposed in the early stage of the reaction to cause a shortage of hydrogen peroxide, which is not preferred. Although the reaction can occur even if the $H_2O_2/Sn$ molar ratio exceeds 3, large amounts of hydrogen peroxide remain under this condition, which is not preferred. In contrast, when the $H_2O_2/Sn$ molar ratio is less than 2, oxidation is insufficient, and a desired tin oxalate aqueous solution cannot be obtained. The reaction may be performed with heating preferably in a range of 30° C. to 70° C. A Sn concentration in the reaction solution is preferably maintained at 0.01% by mass to 8% by mass. A Sn concentration in a tin oxalate aqueous solution finally obtained is preferably 1% by mass to 5% by mass. Hydrogen peroxide may remain in the tin oxalate aqueous solution obtained, and therefore, the tin oxalate aqueous solution is preferably passed through a column filled with a platinum-supported oxidation catalyst to remove the hydrogen peroxide.

A tetraalkoxytitanium having $C_{1-3}$ alkoxyl groups is used as the titanium alkoxide used in the present invention. The tetraalkoxytitanium can be represented by general formula (I):

$$Ti(OR^1)_4 \qquad (I)$$

[in formula (I), $R^1$ are the same as or different from each other and are $C_{1-3}$ alkyl groups].

The four alkoxyl groups of the tetraalkoxytitanium may be the same as or different from each other but are preferably the same because of easy availability. Specific examples of the tetraalkoxytitanium include tetramethoxytitanium, tetraethoxytitanium, tetra-n-propoxytitanium, and tetraisopropoxy titanium. These may be used alone or in combination of two or more thereof.

The quaternary ammonium hydroxide used in the present invention can be represented by general formula (II):

[NR²R³R⁴R⁵]OH    (II)

[in formula (II), $R^2$, $R^3$, $R^4$, and $R^5$ are each independently a $C_{1-8}$ alkyl group, a $C_{1-8}$ hydroxyalkyl group, a $C_{7-15}$ aryloxyalkyl group, or a benzyl group].

Specific examples of the quaternary ammonium hydroxide include tetramethylammonium hydroxide, tetraethylammonium hydroxide, tetrapropylammonium hydroxide, tetrabutylammonium hydroxide, octyltrimethylammonium hydroxide, tributylmethylammonium hydroxide, trioctylmethylammonium hydroxide, benzyltrimethylammonium hydroxide, benzyltriethylammonium hydroxide, benzyltrimethylammonium hydroxide, benzyltributylammonium hydroxide, monomethyltriethanolammonium hydroxide, and dimethyldiethanolammonium hydroxide. Among them, tetramethylammonium hydroxide and tetraethylammonium hydroxide are preferably used.

In the process (a), the titanium alkoxide added is decomposed to generate an alcohol. The by-product alcohol does not necessarily have to be removed. To remove the alcohol, the titanium-containing aqueous solution may be heated to the boiling point of the alcohol or higher, or the alcohol may be removed by distillation under reduced pressure with an evaporator or the like.

The titanium-containing aqueous solution obtained in the process (a) is filled into a pressure resistant container and is subjected to hydrothermal treatment in the process (b). The temperature of the hydrothermal treatment is 100° C. to 200° C. and is preferably 120° C. to 180° C. The time for the hydrothermal treatment is 0.5 hour to 10 hours and is preferably 1 hour to 6 hours. When the temperature of the hydrothermal treatment is below 100° C., crystallization of titanium oxide particles is insufficient, and rutile titanium oxide colloidal particles cannot be obtained. In contrast, when the temperature of the hydrothermal treatment exceeds 200° C., the resultant titanium oxide particles aggregate, and thus a sol cannot be obtained unless dispersion treatment is performed with a homogenizer or the like, which is not preferred.

In the International Centre for Diffraction Data (ICDD) cards used for powder X-ray diffraction analysis, the interplanar spacing d (Å) value in the <110> plane of a tin oxide is 3.35, and d in the <110> plane of a rutile titanium oxide is 3.25. The rutile titanium oxide sol obtained in the present invention is a single-phase rutile crystal because the range of d in the <110> crystal plane obtained from the diffraction pattern measured by powder X-ray diffraction analysis is 3.25<d<3.35.

The rutile titanium oxide sol obtained in the present invention can be observed as oval spherical colloidal particles having a primary particle diameter of 5 nm to 50 nm in a projected image through a transmission electron microscope. The rutile titanium oxide sol obtained has a particle diameter of 5 nm to 100 nm measured with a particle diameter measurement device by dynamic light scattering. The rutile titanium oxide sol has high transparency, and no precipitate is observed even when the sol is left still at room temperature for one week. The pH of the rutile titanium oxide sol is in a range of 3.0 to 14.0.

The rutile titanium oxide sol obtained in the present invention can be washed and/or concentrated by an ultrafiltration method.

The rutile titanium oxide sol obtained in the present invention can be stabilized as a sol by adding an acid and/or a basic compound as needed.

Examples of the acid to be used include inorganic acids such as hydrochloric acid and nitric acid, oxalic acid, lactic acid, tartaric acid, malic acid, citric acid, glycolic acid, hydracrylic acid, α-oxybutyric acid, glyceric acid, and tartronic acid.

Examples of the basic compound to be used include ammonia, an alkali metal hydroxide, alkyl amines such as ethylamine, diethylamine, n-propylamine, isopropylamine, diisopropylamine, dipropylamine, n-butylamine, isobutylamine, diisobutylamine, triethylamine, and benzylamine, alkanolamines such as monoethanolamine and triethanolamine, guanidine hydroxide, quaternary ammonium hydroxides such as tetramethylammonium hydroxide and tetraethylammonium hydroxide, and carbonates such as ammonium carbonate and guanidine carbonate.

The rutile titanium oxide sol obtained in the present invention can be mixed with various types of binders to be used as a coating composition.

Furthermore, a member having a high refractive index film can be obtained by coating a base material with the coating composition. Various materials such as plastics, rubber, glass, metals, ceramics, and paper can be used for the base material.

The refractive index of the film varies depending on the mixing ratio between the rutile, titanium oxide sol and a binder and types of the binder and is in a range of about 1.55 to 2.2.

By further providing an anti-reflective coating, an anti-reflective function can be imparted to a high refractive index film obtained through application of a coating composition containing the rutile titanium oxide sol obtained in the present invention and a binder.

EXAMPLES

The present invention will be specifically explained in Examples and Comparative Examples but is not limited to these examples.

Devices used in measurement and observation are as follows.
[Particle Diameter Measurement by Dynamic Light Scattering]
    N4PLUS (manufactured by Beckman Coulter, Inc.)
[Observation Through Transmission Electron Microscope]
    JEM-1010 (manufactured by JEOL Ltd.)

Production Example 1

849 g of pure water was charged into a 2 L container, and 82 g of oxalic dihydrate [manufactured by Ube Industries, Ltd.] was dissolved therein. Subsequently, 22 g of metal tin powder [manufactured by Yamaishi Metal Co., Ltd.] and 47 g of a 35% hydrogen peroxide aqueous solution [manufactured by Kanto Chemical Co., Inc.] were each divided into ten portions and were alternately charged to the container, and the resultant mixture was maintained at 50° C. to 55° C. for 2 hours. The resultant mixture was passed through a column filled with a platinum catalyst, and excessive hydrogen peroxide was removed to prepare 1000 g of a tin oxalate aqueous solution having a concentration in terms of $SnO_2$ of 2.8% by mass. In the obtained tin oxalate aqueous solution, the oxalic acid concentration was 4.7% by mass as a result of CHN elemental analysis, and the sodium concentration was below the quantitation limit (less than 10 ppb) as a result of atomic absorption spectrometry.

Example 1

27.0 g of pure water was charged into a 200 mL beaker, and 26.9 g of the tin oxalate aqueous solution prepared in Production Example 1 (0.75 g contained in terms of $SnO_2$ and 1.26 g contained in terms of oxalic acid), 14.2 g of titanium tetraisopropoxide [4.0 g contained in terms of $TiO_2$, manufactured by Kanto Chemical Co., Inc.], and 31.9 g of a 25% by mass tetramethylammonium hydroxide aqueous solution [manufactured by Tama Chemicals Co., Ltd.] were added thereto with stirring. The obtained titanium-containing aqueous solution had a molar ratio of tin atoms/titanium atoms of 0.1, a molar ratio of oxalic acid/titanium atoms of 0.28, and a molar ratio of tetramethylammonium hydroxide/titanium atoms of 0.28. 100 g of the titanium-containing aqueous solution was heated at 80° C. for 2 hours. The titanium-containing aqueous solution after being heated had a pH of 14.0, an electric conductivity of 64.2 mS/cm, and a concentration in terms of $TiO_2$ of 4.0% by mass. 60 g of the titanium-containing aqueous solution after being heated was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 14.0, an electric conductivity of 76.3 mS/cm, a concentration in terms of $TiO_2$ of 4.0% by mass, a tetramethylammonium hydroxide concentration of 9.1% by mass, an oxalic acid concentration of 1.3% by mass, and a particle diameter measured by dynamic light scattering of 37 nm. Circular particles of 20 nm to 30 nm were observed in the obtained sol through transmission electron microscope observation. The obtained sol was dried at 110° C., and the resultant powder was subjected to X-ray diffraction analysis. The d value was 3.26, which verified that the powder was a single-phase rutile crystal.

Example 2

197 g of pure water was charged into a 2 L container, and 269 g of the tin oxalate aqueous solution prepared in Production Example 1 (7.5 g contained in terms of $SnO_2$ and 12.6 g contained in terms of oxalic acid), 142 g of titanium tetraisopropoxide (40 g contained in terms of $TiO_2$), 73 g of oxalic dihydrate (52 g in terms of oxalic acid), and 319 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.4, and a molar ratio of tetramethylammonium hydroxide/titanium atoms of 1.75. 1000 g of the titanium-containing aqueous solution was heated at 80° C. for 2 hours, was further maintained at a reduced pressure of 580 Torr for 2 hours, and then was prepared to have a concentration in terms of $TiO_2$ of 4.0% by mass with pure water. The obtained titanium-containing aqueous solution had a of 5.1 and an electric conductivity of 30.9 mS/cm. 1000 g of the concentration adjusted titanium-containing aqueous solution was charged into a 3 L glass lined autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 3.9, an electric conductivity of 32.6 mS/cm, a concentration in terms of $TiO_2$ of 40% by mass, a tetramethylammonium hydroxide concentration of 80% by mass, an oxalic acid concentration of 6.5% by mass, and a particle diameter measured by dynamic light scattering of 16 nm. Oval particles having a minor axis of 5 nm and a major axis of 15 nm were observed in the obtained sol through transmission electron microscope observation. The obtained sol was dried at 110° C., and the resultant powder was subjected to X-ray diffraction analysis. The d value was 3.26, which verified that the powder was a single-phase rutile crystal. 1000 g of the rutile titanium oxide aqueous sol was concentrated with a rotary evaporator to produce a stable rutile titanium oxide aqueous sol having a concentration in terms of $TiO_2$ of 20.5% by mass. The particle diameter measured by dynamic light scattering was 16 nm.

Example 3

44.9 g of pure water was charged into a 200 mL beaker, and 26.9 g of the tin oxalate aqueous solution prepared in Production Example 1 (0.75 g contained in terms of $SnO_2$ and 1.26 g contained in terms of oxalic acid), 14.2 g of titanium tetraisopropoxide (4.0 g contained in terms of $TiO_2$), 2.2 g of oxalic dihydrate (1.6 g in terms of oxalic acid), and 11.8 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 0.63, and a molar ratio of tetramethylammonium hydroxide/titanium atoms of 0.65. 100 g of the titanium-containing aqueous solution was heated at 80° C. for 2 hours. The titanium-containing aqueous solution after being heated had a pH of 3.6, an electric conductivity of 15.8 mS/cm, and a concentration in terms of $TiO_2$ of 4.0% by mass. 60 g of the titanium-containing aqueous solution after being heated was charged into a 100 mL Teflon registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 3.4, an electric conductivity of 18.0 mS/cm, a concentration in terms of $TiO_2$ of 4.0% by mass, a tetramethylammonium hydroxide concentration of 3.0% by mass, an oxalic acid concentration of 2.9% by mass, and a particle diameter measured by dynamic light scattering of 22 nm. Oval particles having a minor axis of 5 nm and a major axis of 15 nm were observed in the obtained sol through transmission electron microscope observation. The obtained sol was dried at 110° C. and the resultant powder was subjected to X-ray diffraction analysis. The d value was 3.29, which verified that the powder was a single-phase rutile crystal.

Example 4

3.5 g of pure water was charged into a 200 mL beaker, and 26.9 g of the tin oxalate aqueous solution prepared in Production Example 1 (0.75 g contained in terms of $SnO_2$ and 1.26 g contained in terms of oxalic acid), 14.2 g of titanium tetraisopropoxide (4.0 g contained in terms of $TiO_2$), 9.8 g of oxalic dihydrate (7.0 g in terms of oxalic acid), and 45.6 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.8, and a molar ratio of tetramethylammonium hydroxide/titanium atoms of 2.5. 100 g of the titanium-containing aqueous solution was heated at 90° C. for 2 hours. The titanium-containing aqueous solution after being heated had a pH of 4.9, an electric conductivity of 37.4 mS/cm, and a concentration in terms of TiO$_2$ of 4.0% by mass. 60 g of the titanium-containing aqueous solution after being heated was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 4.2, an electric conductivity of 41.0 mS/cm, a concentration in terms of TiO$_2$ of 4.0% by mass, a tetramethylammonium hydroxide concentration of 11.4% by mass, an oxalic acid concentration of 8.3% by mass, and a particle diameter measured by dynamic light scattering of 17 nm. Oval particles having a minor axis of 5 nm and a major axis of 20 nm were observed in the obtained sol through transmission electron microscope observation. The obtained sol was dried at 110° C., and the resultant powder was subjected to X-ray diffraction analysis, which verified that the powder was a single-phase rutile crystal.

Example 5

30.6 g of pure water was charged into a 200 mL beaker, and 37.7 g of the tin oxalate aqueous solution prepared in Production Example 1 (1.1 g contained in terms of SnO$_2$ and 1.8 g contained in terms of oxalic acid), 2.8 g of titanium tetraisopropoxide (0.79 g contained in terms of TiO$_2$), 0.64 g of oxalic dihydrate (0.45 g in terms of oxalic acid), and 7.3 g of a 25% by mass tetramethylammonium hydroxide aqueous solution were added thereto with stirring. The obtained titanium-containing aqueous solution had a molar ratio of tin atoms/titanium atoms of 0.7, a molar ratio of oxalic acid/titanium atoms of 2.5, and a molar ratio of tetramethylammonium hydroxide/titanium atoms of 1.75. 79.0 g of the titanium-containing aqueous solution was heated at 80° C. for 2 hours. The titanium-containing aqueous solution after being heated had a pH of 3.2, an electric conductivity of 18.3 mS/cm, and a concentration in terms of TiO$_2$ of 1.0% by mass. 60 g of the titanium-containing aqueous solution after being heated was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 3.2, an electric conductivity of 14.5 mS/cm, a concentration in terms of TiO$_2$ of 1.0% by mass, a tetramethylammonium hydroxide concentration of 2.3% by mass, an oxalic acid concentration of 2.3% by mass, and a particle diameter measured by dynamic light scattering of 14 nm. Aggregated particles of 15 nm to 30 nm in which particles having a primary particle diameter of about 5 nm were collected were observed in the obtained sol through transmission electron microscope observation. The obtained sol was dried at 110° C., and the resultant powder was subjected to X-ray diffraction analysis. The d value was 3.34, which verified that the powder was a single-phase rutile crystal.

Example 6

19.7 g of pure water was charged into a 200 mL beaker, and 26.9 g of the tin oxalate aqueous solution prepared in Production Example 1 (0.75 g contained in terms of SnO$_2$ and 1.26 g contained in terms of oxalic acid), 14.2 g of titanium tetraisopropoxide (4.0 g contained in terms of TiO$_2$), 7.3 g of oxalic dihydrate (5.2 g in terms of oxalic acid), and 31.9 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.4, and a molar ratio of tetramethylammonium hydroxide/titanium atoms of 1.75. 100 g of the titanium-containing aqueous solution was heated at 80° C. for 2 hours, was further maintained at a reduced pressure of 580 Torr for 2 hours, and then was prepared to have a concentration in terms of TiO$_2$ of 4.0% by mass with pure water. The obtained titanium-containing aqueous solution had a pH of 5.1, an electric conductivity of 30.9 mS/cm, and a concentration in terms TiO$_2$ of 4.0% by mass. 60 g of the concentration adjusted titanium-containing aqueous solution was charged into a 100 mL Teflon (registered trademark) autoclave container and was subjected to hydrothermal treatment at 100° C. for 5 hours. After the hydrothermal treatment, the resultant solution was cooled to room temperature. The solution after the hydrothermal treatment was a light translucent white titanium oxide aqueous sol. The obtained sol had a pH of 4.4, an electric conductivity of 32.1 mS/cm, a concentration in terms of TiO$_2$ of 4.0% by mass, a tetramethylammonium hydroxide concentration of 8.0% by mass, an oxalic acid concentration of 6.5% by mass, and a particle diameter measured by dynamic light scattering of 19 nm. Oval particles of about 10 nm were observed in the obtained sol through transmission electron microscope observation. The obtained sol was dried at 110° C., and the resultant powder was subjected to X-ray diffraction analysis, which verified that the powder was a single-phase rutile crystal.

Example 7

19.7 g of pure water was charged into a 200 mL beaker, and 26.9 g of the tin oxalate aqueous solution prepared in Production Example 1 (0.75 g contained in terms of SnO$_2$ and 1.26 g contained in terms of oxalic acid), 14.2 g of titanium tetraisopropoxide (4.0 g contained in terms of TiO$_2$), 7.3 g of oxalic dihydrate (5.2 g in terms of oxalic acid), and 31.9 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.4, and a molar ratio of tetramethylammonium hydroxide/titanium atoms of 1.75. 100 g of the titanium-containing aqueous solution was heated at 80° C. for 2 hours, was further maintained at a reduced pressure of 580 Torr for 2 hours, and then was prepared to have a concentration in terms of TiO$_2$ of 4.0% by mass with pure water. The obtained titanium-containing aqueous solution had a pH of 5.1, an electric conductivity of 30.9 mS/cm, and a concentration in terms of TiO$_2$ of 4.0% by mass. 100 g of the concentration adjusted titanium-containing aqueous solution was charged into a 200 mL SUS autoclave container and was subjected to hydrothermal treatment at 180° C. for 5 hours. After the hydrothermal treatment, the resultant solution was cooled to room temperature. The solution after the hydrothermal treatment was a light translucent white titanium oxide aqueous sol. The obtained sol had a pH of 6.9, an electric conductivity of 41.6 mS/cm, a concentration in terms of TiO$_2$ of 4.0% by mass, a tetramethylammonium hydroxide concentration of 8.0% by mass, an oxalic acid concentration of 6.5% by mass, and a particle diameter measured by dynamic light scattering of 81 nm. Oval particles of about 20 nm were observed in the obtained sol through transmission electron microscope observation. The obtained sol was dried at 110° C., and the resultant powder was subjected to X-ray diffraction analysis, which verified that the powder was a single-phase rutile crystal.

Production Example 2

20 g of pure water was charged into a 100 mL beaker, and 1.46 g of sodium stannate [51.7 g contained in terms of SnO$_2$, manufactured by Showa Kako Corp.] was dissolved therein.

Subsequently, the resultant solution was passed through a column filled with a hydrogen type cation-exchange resin [Amberlite (registered trademark) IR-120B] to remove sodium, thereby 45.2 g of a stannic acid aqueous solution having a concentration in terms of $SnO_2$ of 1.6% by weight was prepared. As a result of atomic absorption spectrometry, the sodium concentration in the stannic acid aqueous solution was 6 ppm.

Comparative Example 1

22.1 g of pure water was charged into a 200 mL beaker, and 45.2 g of the stannic acid aqueous solution prepared in Production Example 2. (0.72 g contained in terms of $SnO_2$), 14.2 g of titanium tetraisopropoxide (4.0 g contained in terms of $TiO_2$), 7.9 g of oxalic dihydrate (5.6 g in terms of oxalic acid), and 30.6 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.3, and a molar ratio of tetramethylammonium hydroxide/titanium atoms of 1.75. 95.9 g of the titanium-containing aqueous solution was heated at 80° C. for 2 hours. The titanium-containing aqueous solution after being heated had a pH of 5.9, an electric conductivity of 31.5 mS/cm, and a concentration in terms of $TiO_2$ of 4.0% by mass. 60 g of the titanium-containing aqueous solution after being heated was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 3.9, an electric conductivity of 36.0 mS/cm, a concentration in terms of $TiO_2$ of 4.0% by mass, a tetramethylammonium hydroxide concentration of 8.0% by mass, an oxalic acid concentration of 5.8% by mass, and a particle diameter measured by dynamic light scattering of 17 nm. Circular particles of about 5 nm and oval particles having a minor axis of 5 nm and a major axis of 25 nm were observed in the obtained sol through transmission electron microscope observation. The obtained sol was dried at 110° C., and the resultant powder was subjected to X-ray diffraction analysis, which verified that the powder was a mixture of an anatase crystal and a rutile crystal.

Comparative Example 2

19.7 g of pure water was charged into a 200 mL beaker, and 17.7 g of a 10% by mass tin(IV) isopropoxide isopropanol solution (manufactured by Alfa Aesar GmbH & Co. KG) (0.75 g contained in terms of $SnO_2$), 14.2 g of titanium tetraisopropoxide (4.0 g contained in terms of $TiO_2$), 9.5 g of oxalic dihydrate (6.7 g in terms of oxalic acid), and 36.4 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.5, and a molar ratio of tetramethylammonium hydroxide/titanium atoms of 2.0. 100 g of the titanium-containing aqueous solution was heated at 90° C. for 2 hours. The titanium-containing aqueous solution after being heated had a pH of 4.7, an electric conductivity of 28.6 mS/cm, and a concentration in terms of $TiO_2$ of 4.0% by mass. 60 g of the titanium-containing aqueous solution after being heated was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 3.9, an electric conductivity of 31.4 mS/cm, a concentration in terms of $TiO_2$ of 4.0% by mass, a tetramethylammoniim hydroxide concentration of 9.1% by mass, an oxalic acid concentration of 6.7% by mass, and a particle diameter measured by dynamic light scattering of 16 nm. Rounded particles of 5 nm and oval particles having a minor axis of 5 nm and a major axis of 20 nm were observed in the obtained sol through transmission electron microscope observation. The obtained sol was dried at 110° C., and the resultant powder was subjected to X-ray diffraction analysis, which verified that the powder was a mixture of an anatase crystal and a rutile crystal.

Comparative Example 3

74.7 g of pure water was charged into a 200 mL beaker, and 13.5 g of the tin oxalate aqueous solution prepared in Production Example 1 (0.38 g contained in terms of $SnO_2$ and 0.63 g contained in terms of oxalic acid), 7.1 g of titanium tetraisopropoxide (2.0 g contained in terms of $TiO_2$), 4.2 g of oxalic dihydrate (3.0 g in terms of oxalic acid), and 63.8 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.6, and a molar ratio of tetramethylammonium hydroxide/oxalic acid of 7.0. 100 g of the titanium-containing aqueous solution was heated at 80° C. for 2 hours, was further maintained at a reduced pressure of 580 Torr for 2 hours, and then was prepared to have a concentration in terms of $TiO_2$ of 4.0% by mass with pure water. The adjusted titanium-containing aqueous solution had a pH of 14.6, an electric conductivity of 62.1 mS/cm, and a concentration in terms of $TiO_2$ of 2.0% by mass. 60 g of the concentration adjusted titanium-containing aqueous solution was charged into a 100 mL Teflon (registered trademark) autoclave container and was subjected to hydrothermal treatment at 140° C. for 5 hours. The resultant solution was cooled to room temperature and taken out. The solution after the treatment was a light translucent white titanium oxide aqueous sol. The obtained sol had a pH of 14.0, an electric conductivity of 50.0 mS/cm, a concentration in terms of $TiO_2$ of 2.0% by mass, a tetramethylammonium hydroxide concentration of 15.9% by mass, an oxalic acid concentration of 3.6% by mass, and a particle diameter measured by dynamic light scattering of 115 nm. Spherical particles of about 20 nm and oval particles having a minor axis of 70 nm and a major axis of 350 nm were observed in the obtained sol through transmission electron microscope observation. The obtained sol was dried at 110° C., and the resultant powder was subjected to X-ray diffraction analysis, which verified that the powder was a mixture of a rutile crystal and a brookite crystal.

Comparative Example 4

19.7 g of pure water was charged into a 200 mL beaker, and 26.9 g of the tin oxalate aqueous solution prepared in Production Example 1 (0.75 g contained in terms of $SnO_2$ and 1.26 g contained in terms of oxalic acid), 14.2 g of titanium tetraisopropoxide (4.0 g contained in terms of $TiO_2$), 7.3 g of oxalic dihydrate (5.2 g in terms of oxalic acid), and 31.9 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 1.4, and a molar ratio of tetramethylammonium hydroxide/titanium atoms of 1.75. 100 g of the titanium-containing aqueous solution was heated at 80° C. for 2 hours, was further maintained at a reduced pressure of 580 Torr for 2 hours, and then was prepared to have a concentration in terms of $TiO_2$ of 4.0% by mass with pure water. The adjusted titanium-containing aqueous solution had a pH of 5.1, an electric conductivity of 30.9 mS/cm, and a concentration in terms of $TiO_2$ of 4.0% by mass. 100 g of the concentration adjusted titanium-containing aqueous solution was charged into a 200 mL SUS autoclave container and was subjected to hydrothermal treatment at 220° C. for 5 hours. After the hydrothermal treatment, the resultant solution was cooled to room temperature. The solution after the hydrothermal treatment was a translucent white suspension. The obtained suspension had a pH of 8.2, an electric conductivity of 42.0 mS/cm, a concentration in terms of $TiO_2$ of 4.0% by mass, a tetramethylammonium hydroxide concentration of 8.0% by mass, an oxalic acid concentration of 6.5% by mass, and a particle diameter measured by dynamic light scattering of 950 nm. Aggregates of 500 nm or larger in which colloidal particles having a primary diameter of about 5 nm aggregated were observed in the obtained suspension through transmission electron microscope observation. The obtained suspension was dried at 110° C., and the resultant powder was subjected to X-ray diffraction analysis, which verified that the powder was a rutile crystal.

Comparative Example 5

32.2 g of pure water was charged into a 200 mL beaker, and 13.5 g of the tin oxalate aqueous solution prepared in Production Example 1 (0.38 g contained in terms of $SnO_2$ and 0.63 g contained in terms of oxalic acid), 14.2 g of titanium tetraisopropoxide (4.0 g contained in terms of $TiO_2$), 7.8 g of oxalic dihydrate (5.5 g in terms of oxalic acid), and 31.9 g of a 25% by mass tetramethylammonium hydroxide aqueous solution were added thereto with stirring. The obtained titanium-containing aqueous solution had a molar ratio of tin atoms/titanium atoms of 0.05, a molar ratio of oxalic acid/titanium atoms of 1.4, and a molar ratio of tetramethylammonium hydroxide/titanium atoms of 1.75. 100 g of the titanium-containing aqueous solution was heated at 80° C. for 2 hours. The titanium-containing aqueous solution after being heated had a pH of 4.7, an electric conductivity of 29.4 mS/cm, and a concentration in terms of $TiO_2$ of 4.0% by mass. 100 g of the titanium-containing aqueous solution after being heated was charged into a 200 mL SUS autoclave container and was subjected to hydrothermal treatment at 180° C. for 5 hours. After the hydrothermal treatment, the resultant solution was cooled to room temperature. The solution after the hydrothermal treatment was a light translucent white titanium oxide aqueous sol. The obtained sol had a pH of 3.9, an electric conductivity of 32.0 mS/cm, a concentration in terms of $TiO_2$ of 4.0% by mass, a tetramethylammonium hydroxide concentration of 8.0% by mass, an oxalic acid concentration of 6.5% by mass, and a particle diameter measured by dynamic light scattering of 22 nm. Oval particles having a minor axis of 5 nm and a major axis of 20 nm were observed in the obtained sol through transmission electron microscope observation. The obtained sol was dried at 110° C., and the resultant powder was subjected to X-ray diffraction analysis, which verified that the powder was a mixture of a rutile crystal and an anatase crystal.

Comparative Example 6

39.6 g of pure water was charged into a 200 mL beaker, and 13.5 g of the tin oxalate aqueous solution prepared in Production Example 1 (0.38 g contained in terms of $SnO_2$ and 0.63 g contained in terms of oxalic acid), 7.2 g of titanium tetraisopropoxide (2.0 g contained in terms of $TiO_2$), 21.5 g of oxalic dihydrate (15.3 g in terms of oxalic acid), and 18.2 g of a 25% by mass tetramethylammonium hydroxide aqueous solution were added thereto with stirring. The obtained titanium-containing aqueous solution had a molar ratio of tin atoms/titanium atoms of 0.1, a molar ratio of oxalic acid/titanium atoms of 7.1 and a molar ratio of tetramethylammonium hydroxide/titanium atoms of 2.0. 100 g of the titanium-containing aqueous solution was heated at 80° C. for 2 hours, was further maintained at a reduced pressure of 580 Torr for 2 hours, and then was prepared to have a concentration in terms of $TiO_2$ of 4.0% by mass with pure water. The obtained titanium-containing aqueous solution had a pH of 2.1, an electric conductivity of 93.5 mS/cm, and a concentration in terms of $TiO_2$ of 2.0% by mass. 60 g of the concentration adjusted titanium-containing aqueous solution was charged into a 100 mL Teflon (registered trademark) autoclave container and was subjected to hydrothermal treatment at 140° C. for 5 hours. After the hydrothermal treatment, the resultant solution was cooled to room temperature. The solution after the hydrothermal treatment was a translucent white suspension. The obtained suspension had a pH of 2.1, an electric conductivity of 27.0 mS/cm, a concentration in terms of $TiO_2$ of 2.0% by mass, a tetramethylammonium hydroxide concentration of 2.3% by mass, an oxalic acid concentration of 15.9% by mass, and a particle diameter measured by dynamic light scattering of 243 nm. Aggregates of 300 nm or larger in which colloidal particles having a primary diameter of about 4 nm aggregated were observed in the obtained suspension through transmission electron microscope observation. The obtained suspension was dried at 110° C., and the resultant powder was subjected to X-ray diffraction analysis, which verified that the powder was a rutile crystal.

Comparative Example 7

36.2 g of pure water was charged into a 200 mL beaker, and 17.7 g of a 10% by mass tin(IV) isopropoxide isopropanol solution (manufactured by Alfa Aesar GmbH & Co. KG) (0.75 g contained in terms of $SnO_2$), 14.2 g of titanium tetraisopropoxide (4.0 g contained in terms of $TiO_2$), and 31.9 g of a 25% by mass tetramethylammonium hydroxide aqueous solution were added thereto with stirring. The obtained titanium-containing aqueous solution had a molar ratio of tin atoms/titanium atoms of 0.1 and a molar ratio of tetramethylammonium hydroxide/titanium atoms of 1.75. 100 g of the titanium-containing aqueous solution was heated at 90° C. for 2 hours. The titanium-containing aqueous solution after being heated had a pH of 14, an electric conductivity of 64.9 mS/cm, and a concentration in terms of $TiO_2$ of 4.0% by mass. 60 g of the titanium-containing aqueous solution after being heated was charged into a 100 mL Teflon registered trademark) autoclave container and was subjected to hydrothermal treatment at 140° C. for 5 hours. After the hydrothermal treatment, the resultant solution was cooled to room temperature. The solution after the hydrothermal treatment was a light translucent white titanium oxide aqueous sol. The obtained sol had a pH of 14, an electric conductivity of 67.4 mS/cm, a concentration in terms of $TiO_2$ of 4.0% by mass, a tetramethylammonium hydroxide concentration of 9.1% by mass, and a particle diameter measured by dynamic light scattering of 125 nm. Spherical particles of 2 nm to 3 nm were observed in the obtained sol through transmission electron microscope observation. The obtained sol was dried at 110° C., and the resultant powder was subjected to X-ray diffraction analysis, which verified that the powder was a mixture of an anatase crystal and a rutile crystal.

TABLE 1

| Reaction condition | Example 1 | Example 2 | Example 3 | Example 4 | Example 5 | Example 6 | Example 7 |
|---|---|---|---|---|---|---|---|
| Sn/Ti molar ratio | 0.1 | 0.1 | 0.1 | 0.1 | 0.7 | 0.1 | 0.1 |
| Oxalic acid/Ti molar ratio | 0.28 | 1.4 | 0.63 | 1.8 | 2.5 | 1.4 | 1.4 |
| $NR_4(OH)$(*)/Ti molar ratio | 2.0 | 1.75 | 0.65 | 2.5 | 1.75 | 1.75 | 1.75 |
| Concentration in terms of $TiO_2$ (% by mass) | 4.0 | 4.0 | 4.0 | 4.0 | 1.0 | 4.0 | 4.0 |
| pH of titanium-containing aqueous solution | 14.0 | 5.1 | 3.6 | 4.9 | 3.2 | 5.1 | 5.1 |
| Hydrothermal treatment temperature (° C.) | 140 | 140 | 140 | 140 | 140 | 100 | 180 |
| Physical properties of sol | | | | | | | |
| Particle diameter (nm)(**) | 37 | 16 | 22 | 17 | 14 | 19 | 81 |
| Cristal phase | Rutile | Rutile | Rutile | Rutile | Rutile | Rutile | Rutile |

| Reaction condition | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Sn/Ti molar ratio | 0.1 | 0.1 | 0.1 | 0.1 | 0.05 | 0.1 | 0.1 |
| Oxalic acid/Ti molar ratio | 1.3 | 1.5 | 1.6 | 1.4 | 1.4 | 7.1 | 0.0 |
| $NR_4(OH)$(*)/Ti molar ratio | 1.75 | 2.0 | 7.0 | 1.75 | 1.75 | 2.0 | 1.75 |
| Concentration in terms of $TiO_2$ (% by mass) | 4.0 | 4.0 | 2.0 | 4.0 | 4.0 | 2.0 | 4.0 |
| pH of titanium-containing aqueous solution | 5.9 | 4.7 | 14.6 | 5.1 | 4.7 | 2.1 | 14.0 |
| Hydrothermal treatment temperature (° C.) | 140 | 140 | 140 | 220 | 180 | 140 | 140 |
| Physical properties of sol | | | | | | | |
| Particle diameter (nm)(**) | 17 | 16 | 115 | 950 | 22 | 243 | 125 |
| Cristal phase | Anatase + rutile | Anatase + rutile | Rutile + brookite | Rutile | Anatase + rutile | Rutile | Anatase + rutile |

$NR_4(OH)$(*): quaternary ammonium hydroxide
Particle diameter (nm)(**): measured by dynamic light scattering

INDUSTRIAL APPLICABILITY

The rutile titanium oxide sol obtained in the present invention is useful in applications to catalysts, photocatalysts, and optical materials, antibacterial applications, anti-fouling applications, and other applications and is particularly useful as titanium oxides for transparent electrodes in dye-sensitized solar cells.

The invention claimed is:

1. A method for producing a rutile titanium oxide sol having a particle diameter measured by dynamic light scattering of 5 nm to 100 nm, the method comprising:
   a process (a): mixing a tin oxalate aqueous solution, a titanium alkoxide, oxalic acid, a quaternary ammonium hydroxide, and water, while adjusting, per mole of titanium atoms, a proportion of tin atoms to be from 0.1 mol to 0.8 mol, a proportion of the oxalic acid to be from 0.01 mol to 5 mol, and a proportion of the quaternary ammonium hydroxide to be from 0.1 mol to 3.5 mol to prepare a titanium-containing aqueous solution having a concentration in terms of $TiO_2$ of 0.1% by mass to 15% by mass; and
   a process (b): performing hydrothermal treatment on the titanium-containing aqueous solution produced in the process (a) at 100° C. to 200° C.

2. The method for producing a rutile titanium oxide sol according to claim 1, wherein the titanium alkoxide is a tetraalkoxytitanium of general formula (I):

$$Ti(OR^1)_4 \qquad (I)$$

[in formula (I), $R^1$ are the same as or different from each other and are $C_{1-3}$ alkyl groups].

3. The method for producing a rutile titanium oxide sol according to claim 1, wherein the quaternary ammonium hydroxide is represented by general formula (II):

$$[NR^2R^3R^4R^5]OH \qquad (II)$$

[in formula (II), $R^2$, $R^3$, $R^4$, and $R^5$ are each independently a $C_{1-8}$ alkyl group, a $C_{1-8}$ hydroxyalkyl group, a $C_{7-15}$ aryloxyalkyl group, or a benzyl group].

4. The method for producing a rutile titanium oxide sol according to claim 3, wherein the quaternary ammonium hydroxide is tetramethylammonium hydroxide or tetraethylammonium hydroxide.

* * * * *